United States Patent
Yu et al.

(10) Patent No.: US 9,309,912 B2
(45) Date of Patent: Apr. 12, 2016

(54) AUTOMATIC RELEASER WITH WIRELESS CONTROLS

(75) Inventors: Minbo Yu, Hangzhou (CN); Zhihua Zhu, Hangzhou (CN); Zhouxuan Li, Hangzhou (CN); Rui Li, Hangzhou (CN); Hongyun Yu, Hangzhou (CN); Qun Yuan, Hangzhou (CN)

(73) Assignee: ZHEJIANG HUADIAN EQUIPMENT TESTING INSTITUTE, Hangzhou, Zhejiang (CN)

( * ) Notice: Subject to any disclaimer, the term of this patent is extended or adjusted under 35 U.S.C. 154(b) by 29 days.

(21) Appl. No.: 13/979,824

(22) PCT Filed: May 3, 2012

(86) PCT No.: PCT/CN2012/075008
§ 371 (c)(1),
(2), (4) Date: Jul. 15, 2013

(87) PCT Pub. No.: WO2013/007126
PCT Pub. Date: Jan. 17, 2013

(65) Prior Publication Data
US 2013/0294828 A1 Nov. 7, 2013

(30) Foreign Application Priority Data
Jul. 12, 2011 (CN) .......................... 2011 1 0195050

(51) Int. Cl.
*F16B 17/00* (2006.01)
*G01M 7/08* (2006.01)
*B64D 17/32* (2006.01)
*A62B 35/00* (2006.01)

(52) U.S. Cl.
CPC ................. *F16B 17/00* (2013.01); *G01M 7/08* (2013.01); *A62B 35/00* (2013.01); *B64D 17/32* (2013.01); *Y10T 403/7075* (2015.01)

(58) Field of Classification Search
None
See application file for complete search history.

(56) References Cited

U.S. PATENT DOCUMENTS

| | | | | |
|---|---|---|---|---|
| 3,012,811 A | * | 12/1961 | Sandrock | 294/110.1 |
| 3,224,369 A | * | 12/1965 | Dunn et al. | 102/348 |
| 3,319,595 A | * | 5/1967 | Van Dorn et al. | 114/294 |
| 3,430,305 A | * | 3/1969 | Geffner | 24/603 |
| 3,628,821 A | * | 12/1971 | Reece | 294/82.28 |
| 3,721,462 A | * | 3/1973 | Pawlitzki | 376/233 |
| 4,082,342 A | * | 4/1978 | Ailshie et al. | 296/190.06 |
| 4,088,055 A | * | 5/1978 | West et al. | 89/1.55 |

(Continued)

FOREIGN PATENT DOCUMENTS

| | | |
|---|---|---|
| CN | 102033245 A | 4/2011 |
| CN | 102393285 A | 3/2012 |

(Continued)

*Primary Examiner* — Daniel P Stodola
*Assistant Examiner* — Matthieu Setliff
(74) *Attorney, Agent, or Firm* — Muncy, Geissler, Olds & Lowe, P.C.

(57) ABSTRACT

A wirelessly-controlled automatic releaser including a housing, rechargeable batteries, wireless controls, an electromagnetic mechanism, and a release mechanism. The housing is provided with a cylindrical configuration having a upper cavity and a coaxial lower cavity. The wireless controller includes a remote control, a control switch, antennas, and a wireless control module. The electromagnetic mechanism includes an electromagnet and an iron core. The release mechanism includes a release pin, a movable sleeve and a release sleeve sequentially suited to one another from inside to outside.

8 Claims, 8 Drawing Sheets

(56) References Cited

U.S. PATENT DOCUMENTS

| | | | | |
|---|---|---|---|---|
| 4,441,674 | A | * | 4/1984 | Holtrop ........................ 244/137.4 |
| 4,807,454 | A | * | 2/1989 | Sengupta et al. ................. 70/277 |
| 8,083,274 | B2 | * | 12/2011 | Caldwell et al. ............... 292/252 |
| 2007/0052252 | A1 | * | 3/2007 | Rohardt et al. ............... 294/82.3 |

FOREIGN PATENT DOCUMENTS

| | | |
|---|---|---|
| CN | 202158944 U | 3/2012 |
| JP | 11281523 | 10/1999 |
| KR | 20110068242 A | 6/2011 |

\* cited by examiner

AUTOMATIC RELEASER WITH WIRELESS CONTROLS

TECHNICAL FIELD

The present invention generally relates to an automatic releaser for an impact test of a safety belt, fall protector, safety net, or differential speed sensor, or for other occasions such as weight release and so on.

BACKGROUND

There are securing appliances designed for operating personnel working at heights which prevents falls, these are generally a safety belt, a differential speed sensor, and a buffering package. The operating personnel working at heights is likely to fall down suddenly resulting in serious consequences, in this situation, the securing appliance plays a great role. However, the injury of operating personnel even when using the securing appliance is still happening. Therefore, the use of a qualified securing appliance is vital in the prevention of falling down injuries. Sudden falling of the operating personnel from a height can generate great impact, which hence requires shock resistance test for the securing appliances.

The performance of a shock resistance test for securing appliance can be evaluated by utilizing with a releaser. Hanging a weight simulating the operating personnel at heights beneath the releaser, while testing, and hanging the releaser and the securing appliance worn by the personnel on a structure at heights, then the weight will fall once the releaser is released. In this situation, a qualified securing appliance can timely enable self-locking to prevent further falling down of the weight, and an unqualified securing appliance contrarily may fracture itself if it is not capable of bearing the impact force, which in turn causes the weight to fall to the ground.

The releaser now equipped in the test, however, is generally a wired releaser in that the releaser hanging at heights is even attached with a long power cable which brings about great trouble and even safety risk in the testing operation. In addition, the power cable chronically being exposed to outdoor weather can be prone to aging, for example, easily being frozen in winter, which is harmful for the power cable itself. There is a need, therefore, for seeking a reasonable and safe releaser for testing.

SUMMARY

The proposed invention addresses or alleviates the above-described problems as well as others, by providing for an automatic releaser with wireless controls and in a reasonable and novel configuration.

Automatic releaser with wireless controls, comprising a housing, rechargeable batteries, wireless controls, an electromagnetic mechanism, and a release mechanism.

The housing is provided with a cylindrical configuration having a upper cavity and a coaxial lower cavity therewith, wherein said upper cavity is communicated with the lower cavity through a center hole, a top cover and a bottom cover are disposed at the top and bottom portions of the housing respectively, an upper hanging ring is fixed into the central portion of the top cover, the rechargeable batteries are arranged within the upper cavity.

The wireless controls includes a remote control, a control switch, antennas, and a wireless control module, wherein the control switch and the antennas are arranged into the top cover, the wireless control module is disposed within the upper cavity.

The electromagnetic mechanism includes an electromagnet and an iron core, wherein the electromagnet is arranged in the central portion of the cavity, the iron core is disposed within the electromagnet.

The release mechanism includes a release pin, a movable sleeve and a release sleeve sequentially suited to one another from inside to outside, wherein the release sleeve, of which a top portion being connected with the iron core and on which a lateral wall two radial through holes all in same size are arranged near the bottom cover, as well as on an outer wall of which an upper and a lower semicircle grooves being formed, are arranged within the lower cavity, wherein the upper semicircle groove passes through the through hole in its diameter direction, and the lower semicircle groove passes through the lower through hole in its diameter direction, a plurality of rubber rings are embedded within said two semicircle grooves respectively.

The movable sleeve, on a lateral wall of which a pair of conical bores being symmetrically formed, is arranged within the release sleeve, wherein the external diameter of the conical bore adjacent to the release sleeve is same as the through holes and the internal diameter is smaller than the external diameter, a steel ball of which diameter being smaller than the said inner side and bigger than the wall thickness of the movable sleeve is disposed within each conical bore, the release pin, at outer lateral of which a pair of semicircular grooves being symmetrically formed and of which lower end being connected with a lower hanging ring, is penetrated into the movable sleeve through a release hole of the bottom cover, wherein the section radius of the semicircular groove equals to the steel balls.

The wireless controls consists of a remote control, a control switch, antennas, and a wireless control module, wherein the remote control is configured to control the testing procedure within the range of 500 meters thereby eliminating the inconvenience used with the supply power line during the test and improving the safety distance for the testing personnel.

The through holes of the movable sleeve is applied with a configuration of alternative sizes at both ends that can prevent the steel ball from falling outwards from the movable sleeve, wherein the steel ball will move forwards to the through hole as the central axis coincides with the conical borehole thereof, thereby releasing the release pin.

The steel ball contacts with the peripheral rubber ring of the through hole of the release sleeve while rolling forwards to it, then moves forwards to the movable sleeve under the action of the elastic force of the ring, wherein the ball will move forwards to the conical bore of movable sleeve as the central axis coincides with the through hole of release sleeve thereof once again, thereby locking the release pin.

As a further preferred embodiment of the present invention, wherein the diameter of the upper cavity is larger than the lower cavity.

As a further preferred embodiment of the present invention, wherein a LED display lamp is further arranged onto the top cover for indicating the operating condition of said disclosed automatic releaser with wireless controls.

As a further preferred embodiment of the present invention, wherein a battery charging connector is further arranged onto the top cover for facilitating the recharging the rechargeable batteries.

As a further preferred embodiment of the present invention, wherein an inner liner is arranged within the upper cavity, the plurality of rechargeable batteries are uniformly arranged within the inner liner along its circumferential direction, the wireless control module is arranged above the rechargeable battery and electromagnet for a compact configuration of the embodiment of the present invention.

As a further preferred embodiment, wherein a securing pin is disposed at the lower cavity adjacent to the upper cavity, the securing pin is mated with the lateral wall of the lower cavity via a screw joint and forms a mechanical linkage with the top portion of the release sleeve. In order to prevent actuation of the release mechanism caused by the incorrect manipulation of the automatic releaser in standby mode, especially with work below its position, it is recommended to tighten the securing pinto form a lock configuration with the top portion of the release sleeve ensuring that the release sleeve should never drop down even if the electromagnet is energized.

As a further preferred embodiment of the present invention, wherein the top portion of the release sleeve is connected with the iron core by a connecting pin that is inserted into an elongated pin hole of the iron core. In said structure, there should be a period of uplink idle stroke for the iron core on startup, which accelerates to uplink, the connecting pin coincides and contacts with the bottom portion of pin hole. At this time, the iron core generates an impact force on the release sleeve thereby easily elevating the release sleeve.

As a further preferred embodiment of the present invention, wherein the inner wall between the upper and lower through hole of the release sleeve tapers downward to decompose the contact pressure generated by the steel ball contacting with the inner wall of the release sleeve of an upward force and an decomposed pressure, thereby reducing the electromagnetic attracting force while the release mechanism is being released, thus being more conducive to releasing the release sleeve.

The above described features and advantages, as well as others, will become more readily apparent to those skilled in the art by reference to the following detailed description and its accompanying drawings. While it would be desirable to provide an automatic releaser that provides one or more of the above mentioned advantageous features, or other advantages as may be apparent to those reviewing this disclosure, the teachings disclosed herein extend to those embodiments which fall within the scope of the appended claims, regardless of whether they accomplish one or more of the aforementioned features or advantages.

BRIEF DESCRIPTION OF THE ACCOMPANYING DRAWINGS

DETAILED DESCRIPTION OF THE PREFERRED EMBODIMENT

Figure 1:
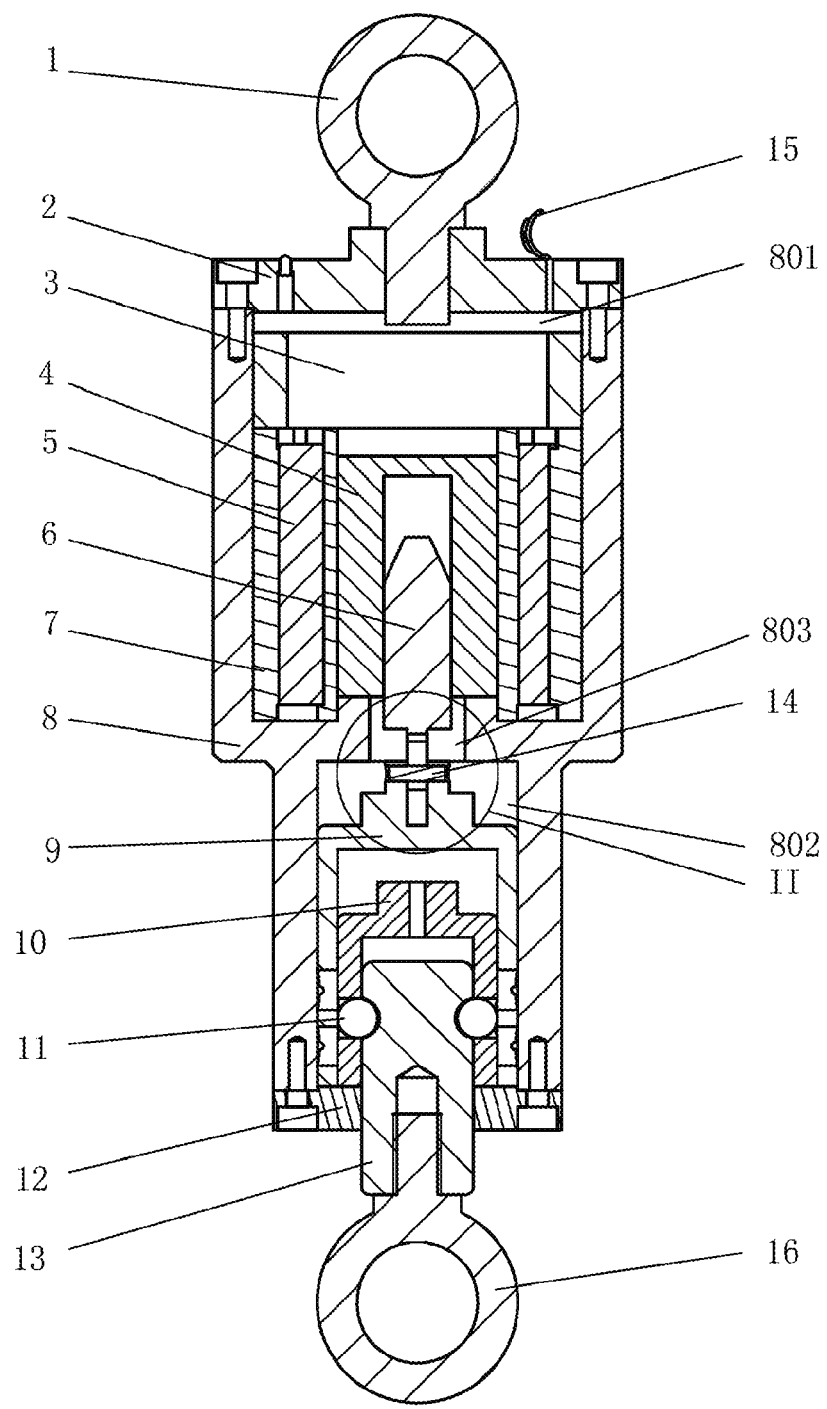
FIG. 1 shows a structural schematic diagram of the automatic releaser of the invention.
Figure 2:
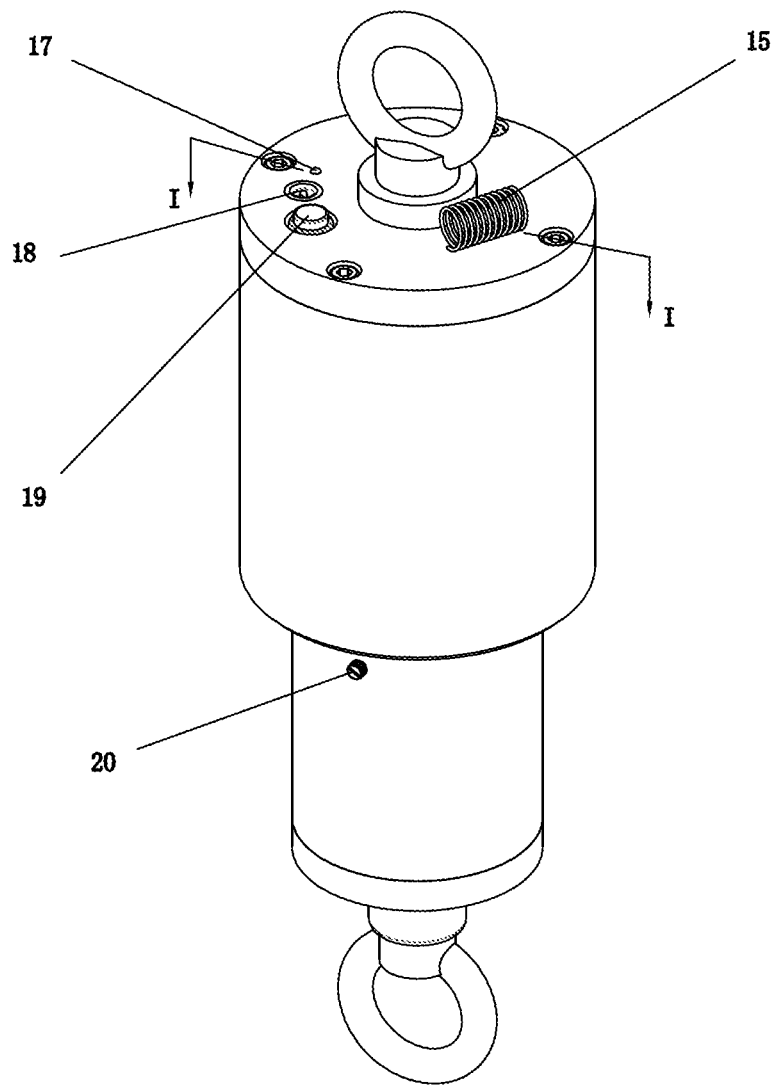
FIG. 2 shows a schematic diagram of an outward appearance of the invention.
Figure 3:
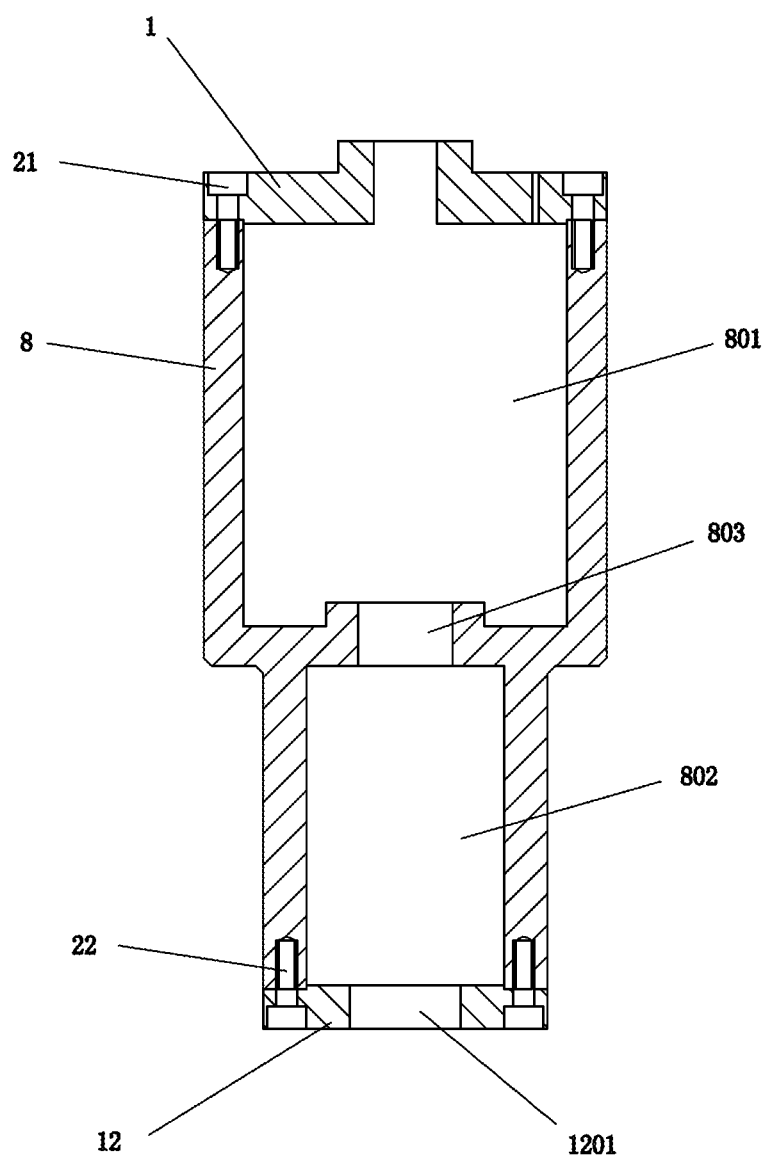
FIG. 3 shows a structural schematic diagram of the housing of the invention cut along plane I of FIG. 2.

With reference now to FIGS. 1, 2 and 3, an automatic releaser with wireless controls of the invention comprising a metal housing 8, rechargeable batteries 5, wireless controls, an electromagnetic mechanism, and a release mechanism, where the wireless controls includes a remote control, a control switch 19, antennas 21, and a wireless control module 3, the electromagnetic mechanism includes an electromagnet 4 and an iron core 6, and the release mechanism includes a release pin 13, a movable sleeve 10 and a release sleeve 9.

The mentioned metal housing 8 is provided with a cylindrical configuration having a upper cavity 801 and a coaxially lower cavity 802 therewith, wherein the diameter of the upper cavity 801 is larger than the lower cavity 802, said upper cavity 801 is connected with the lower cavity 802 through a center hole 803. A top cover 2 and a bottom cover 12 are disposed at the top and bottom portions of the housing 8 respectively.

An upper hanging ring 1 is fixed into the central portion of the top cover 2 for connection with weights. A release hole 1201, into which the release pin may be inserted, is formed in the central portion of the bottom cover 12. A LED display lamp 17, a battery charging connector 18, the control switch 19 and the wireless control antennas 21 are arranged into the top cover 2.

An inner liner 7, an electromagnet 4, the rechargeable batteries 5, the wireless control module 3 are arranged within the upper cavity 801. The release mechanism is disposed within the lower cavity 802.

The inner liner 7 being tightly attached within the upper cavity 801 with the plurality of rechargeable batteries 5 being uniformly arranged within the inner liner 7 along its circumferential direction and the electromagnet 4 being arranged into the central portion of the cavity 801, the batteries provide a power supply for the normal function of the automatic releaser.

The wireless control module 3 is arranged above the rechargeable batteries 5 and the electromagnet 4 that further being electrically connected with the wireless control antennas 21 within the top cover 2 for accomplishing the wireless control to the releaser.

The iron core 6 being vertically disposed within the internal centre of the electromagnet 4 can implement the up-and-down motion under the action of the magnetic field.

Figure 4:
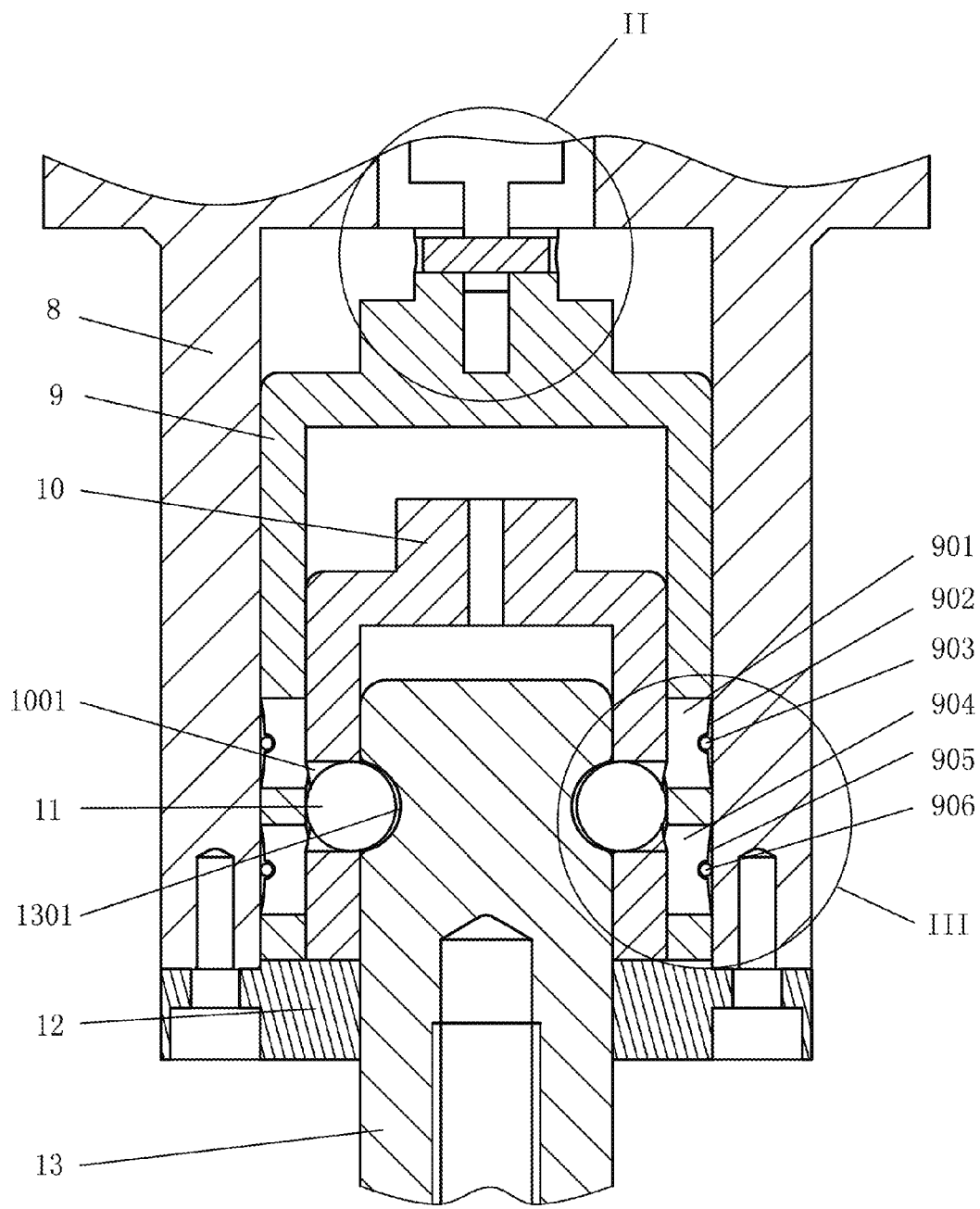
FIG. 4 shows a structural schematic diagram of the release mechanism of the invention.
Figure 5:
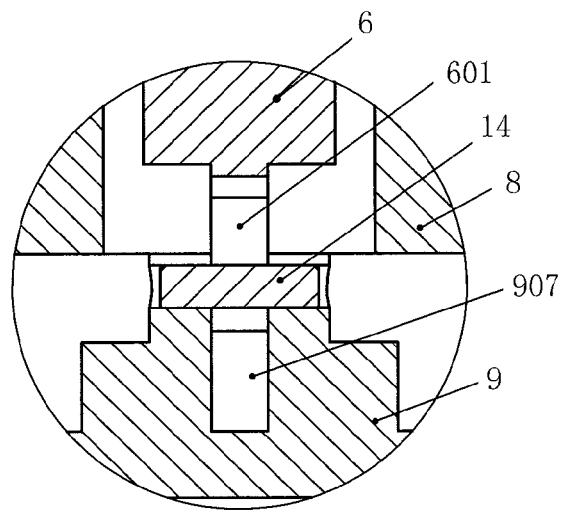
FIG. 5 shows an enlarged cutaway view of the area designated by II in FIG. 4.
Figure 6:
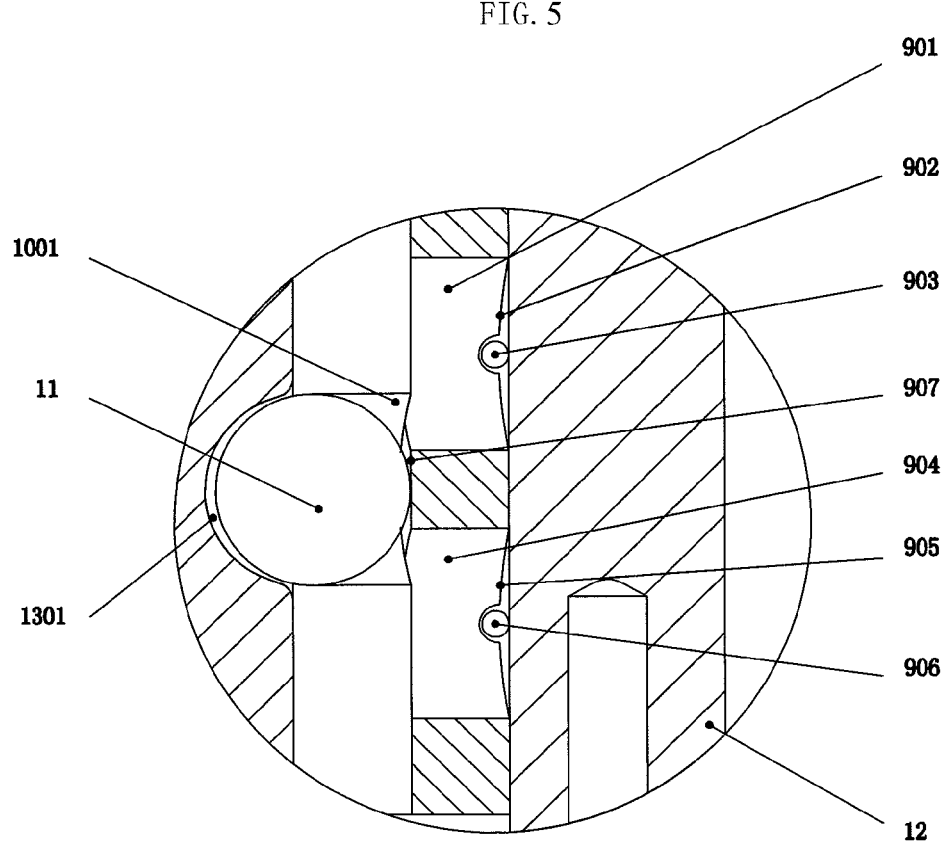
FIG. 6 shows an enlarged cutaway view of the area designated by III in FIG. 4.

With reference now to FIGS. 4, 5 and 6, the release mechanism disposed within the lower cavity 802 includes a release pin 13, a movable sleeve 10 and a release sleeve 9 sequentially enveloping one another from inside to outside. The top portion of release sleeve 9 is connected with the iron core 6 that the release sleeve 9 can actuate the up-and-down motion following the core 6 by a connecting pin 14 that is inserted into a pin hole 601 of the iron core 6 being an elongated pin hole. There should be a period of uplink idle stroke for the iron core 6 on startup, which accelerates to uplink, the connecting pin 14 precisely coincides and contacts with the bottom portion of pin hole 601. At this time, the iron core 6 generates an impact force on the release sleeve thereby easily elevating the release sleeve 9.

Figure 7:
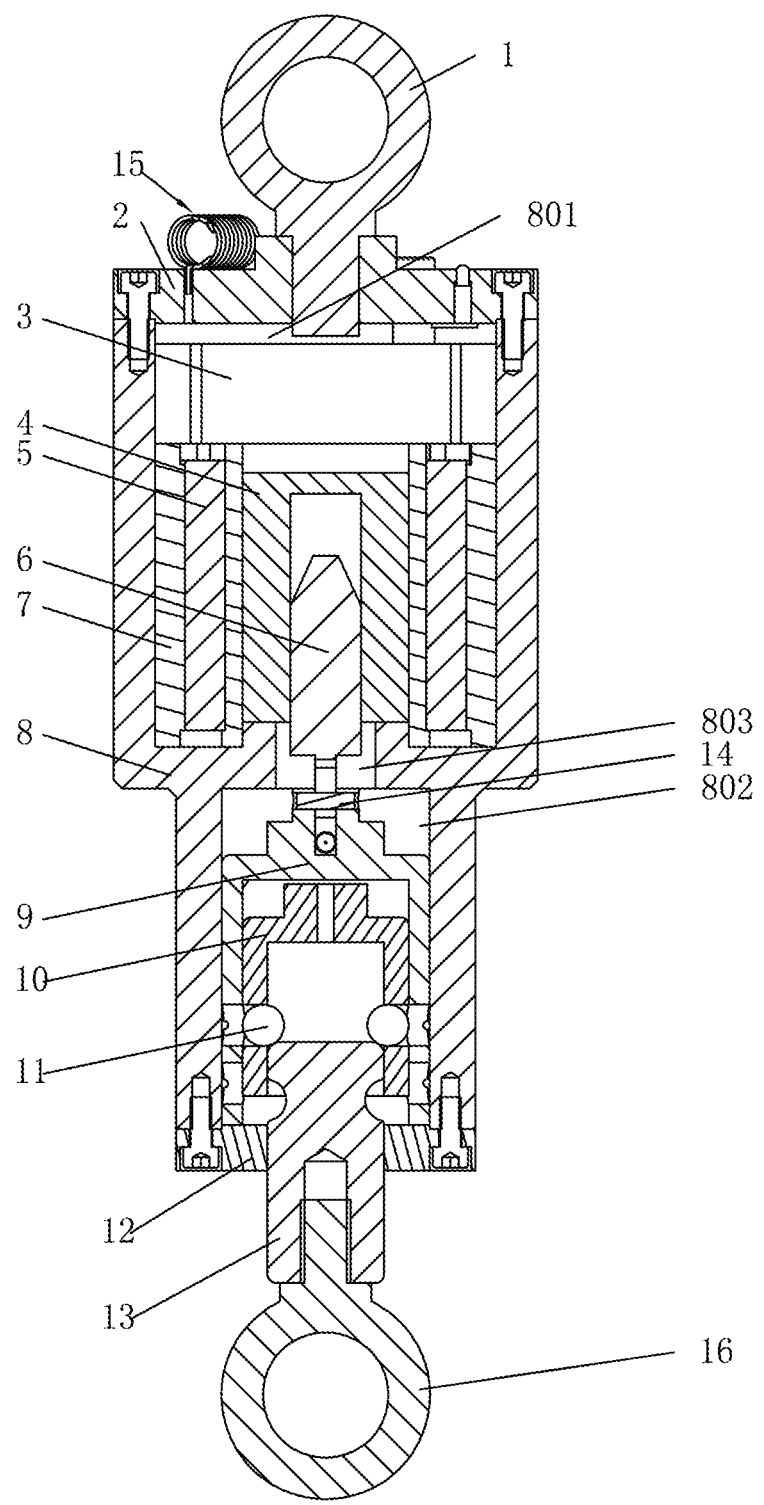
FIG. 7 shows a state diagram of installation of the automatic releaser of the invention cut along plane I of FIG. 2.
Figure 8:
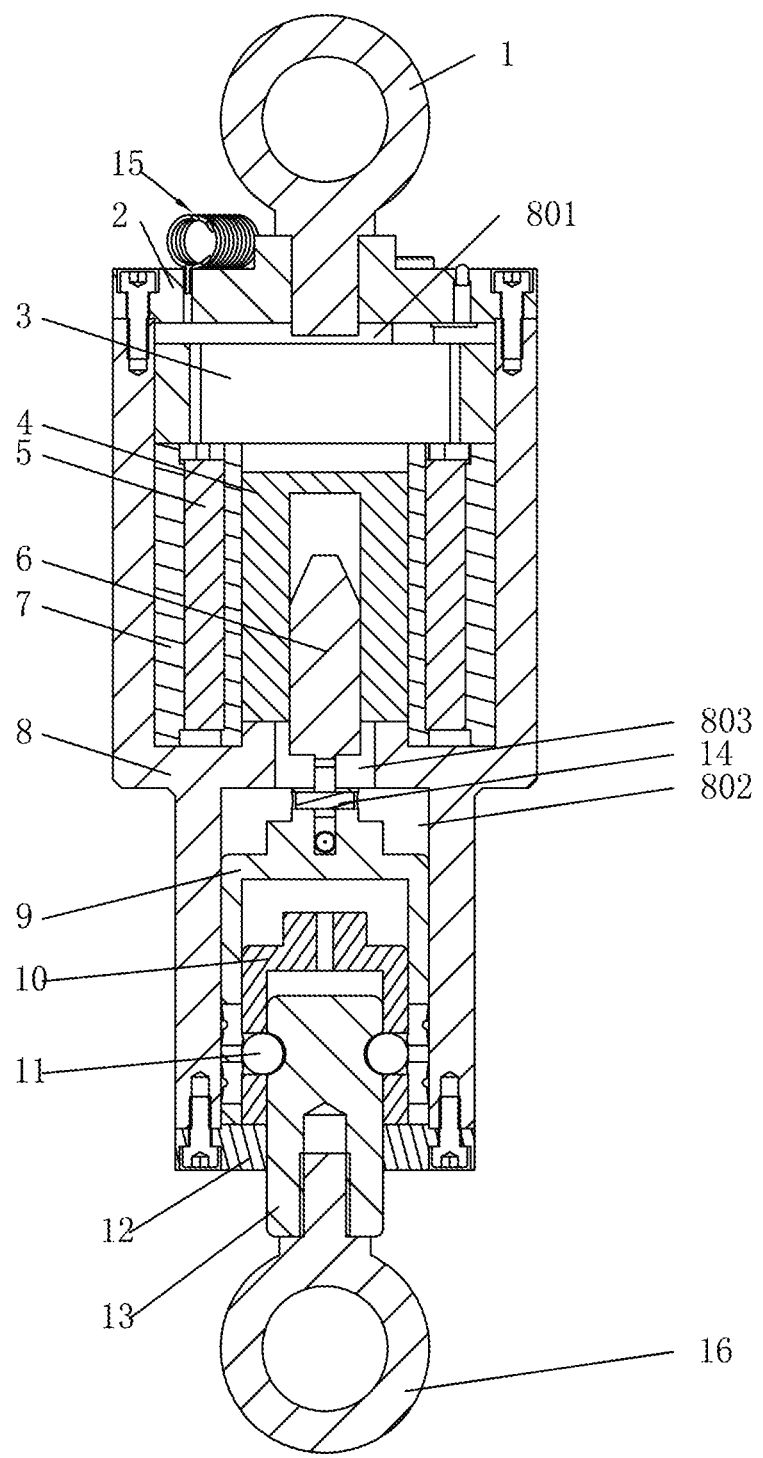
FIG. 8 shows a state diagram of the automatic releaser of the invention to be released cut along plane I of FIG. 2.
Figure 9:
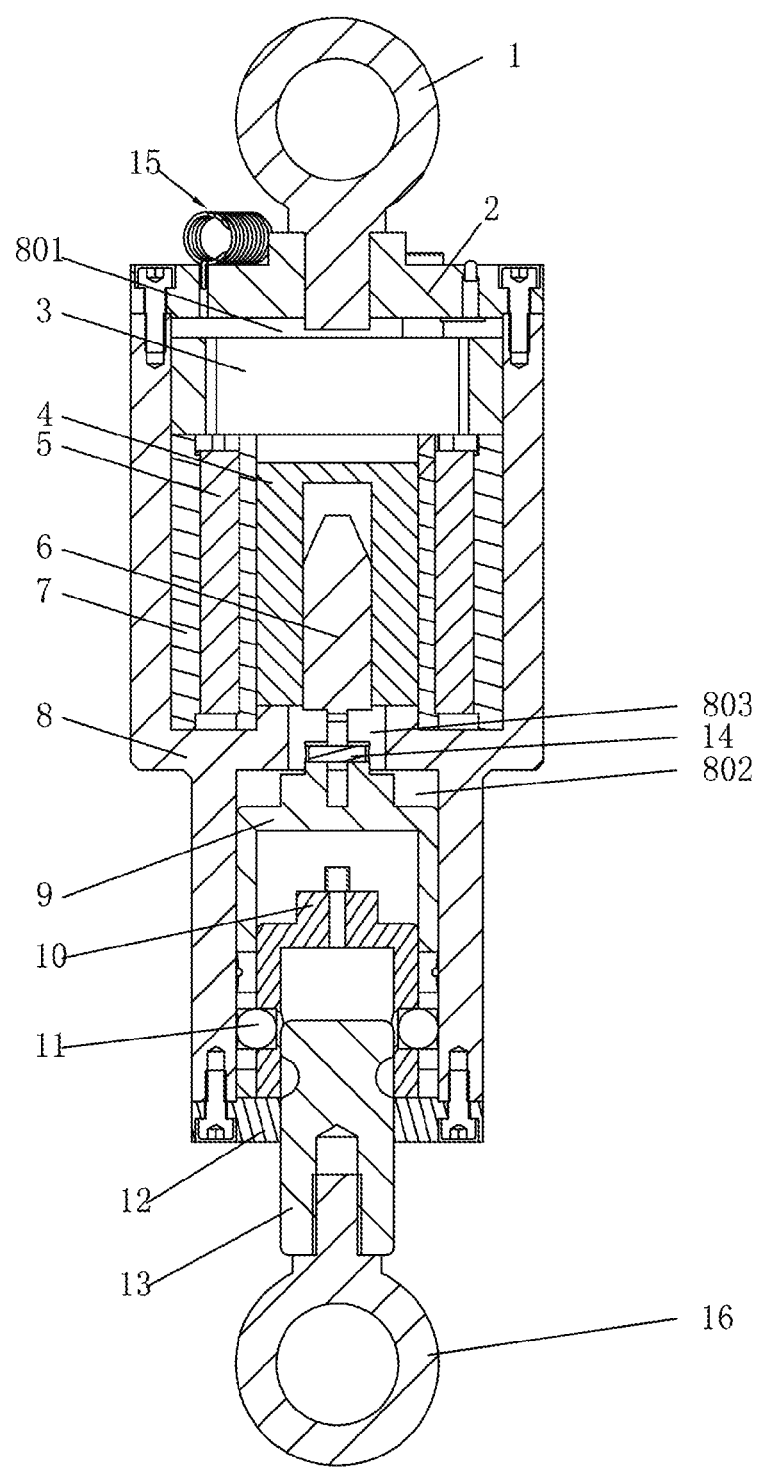
FIG. 9 shows a state diagram of the automatic releaser completely released of the invention cut along plane I of FIG. 2.

With reference to FIGS. 2, 7 and 8, a securing pin 20 is disposed at the lower cavity 802 adjacent to the upper cavity 801, the securing pin 20 is mated within the lateral wall of lower cavity 802 in screw joint, the end contacting with the release sleeve 9, such as being clipped into the lateral wall 907, or arranged onto the step of the top portion of release sleeve 9, to form a lock configuration with the top portion of release sleeve 9 ensuring safety that should never let the release sleeve 9 move upwards and the release mechanism drop down. Two radial thru holes 901 and 904 all the same size are arranged on the lateral wall of the release sleeve 9 nearby the bottom cover 12 with top and bottom arrangement thereof, wherein the inner wall 907 between the upper and lower thru hole 901, 904 of the release sleeve 9 taper slightly. An upper and a lower semicircle grooves 902 and 905 are formed on the outer wall of the release sleeve 9 nearby the bottom cover 12 with top and bottom arrangement thereof, wherein the upper semicircle groove 902 passes through the thru hole 901 in its diameter direction, and the lower semicircle groove 905 passes through the lower thru hole 904 in its diameter direction, a plurality of rubber rings are embedded within said two semicircle grooves 903, 906, respectively.

The movable sleeve 10, on a lateral wall of which a pair of conical bores 1001 being symmetrically formed, is arranged within the release sleeve 9, wherein the external diameter of the conical bore 1001 adjacent to the release sleeve 9 is same as the through holes 901, 904 and the internal diameter is smaller than the external diameter. A steel ball 11 whose diameter is smaller than the said inner side and bigger than the wall thickness of the movable sleeve 10 is disposed within each conical bore 1001. The wall thickness of the movable sleeve 10 approximately equals half of the diameter of the ball 11, a half portion of which thus being disposed out of the conical bore 1001. The conical bore 1001 is applied with a configuration of alternative sizes at both ends that can cause the ball 11 to move forwards to movable sleeve 9, then prevent the steel ball falling outwards from the conical bore 1001.

The release pin 13, at an outer lateral wall of which a pair of semicircular grooves 1301 being symmetrically formed and of the lower end of which being connected with a lower hanging ring 16, can be penetrated into or taken out of the movable sleeve 10 through the release hole 1201 of the bottom cover 12, wherein the section radius of the semicircular groove 1301 is same as the steel balls 11, and the release pin 13 can complement an up-and-down sliding movement within the movable sleeve 10.

Now with reference to FIG. 7, the detailed executing process of the preferred embodiment is specified as following that 1) Inserting the release pin 13 into the movable sleeve 10 through the release hole 1201 of the bottom cover 12, the steel ball 11 is motivated by the release pin 13 contacting with the outer portion of the ball 11 nearby the removable sleeve 10 will move upwards, thereby promoting the upwards sliding movement of the removable sleeve 10;

2) The ball 11 initially extruded by the conical bore 1001 will roll forwards into the upper through hole 901 of the release sleeve 9 as the central axis coincides with the top conical bore 901 thereof;

3) Without the resistance of the ball 11, the release pin 13 then can be inserted into the top portion of the removable sleeve 10 as which central axis of taper hole 1001, and the upper thru hole 901, as well as the semicircular groove 1301 are coincided with each other.

4) The steel ball 11 then contacts with the peripheral rubber ring 903 of the upper thru hole 901 of the release sleeve 9 thereby rolling forwards to the taper hole 1001 and the semicircular groove 1301;

5) Pulling the lower hanging ring 16 on the release pin 13 downwards, as illustrated in FIG. 8, then the release pin 13 motivating the removable sleeve 10 sliding together to the bottom portion thereof and contacting with the bottom cover 12;

6) Hanging the upper hanging ring 1 in the top cover 2 of the automatic releaser of the invention onto a structure at heights;

7) Hanging weights onto the lower hanging ring 13 in the bottom cover 12;

8) Pressing the control switch button 19 in the top cover 2 to initiate the controls;

9) Pressing the remote control button to energize the electromagnet 4 generating the magnetic field;

10) The iron core 6 within the upper cavity moving upwards under the action of the magnetic field, thereby motivating the upward movement of the release sleeve 9 within the lower cavity;

11) As the release sleeve 9 moves up to the upper border such that the central axis of lower through hole 904, and the taper hole 1001 of the removable sleeve, as well as the semicircular groove 1301 of the release pin coincide with each other, the steel ball 11 rolling downwards to the lower through hole of the release sleeve by the pressure of the taper hole 1001;

12) The release pin 12 falling down until the resistance that the ball 11 applies on the release pin 12 has disappeared, thereby completing the process of releasing the weights.

It will be appreciated that the above-described embodiments are merely illustrative, and that those of ordinary skill in the art may readily devise their own implementations and modifications that incorporate the principles of the present invention and fall within the spirit and scope thereof.

What is claimed is:

1. Automatic releaser with wireless controls, comprising a housing, rechargeable batteries, wireless controls, an electromagnetic mechanism, and a release mechanism, further comprising:

the housing being provided with a cylindrical configuration having an upper cavity and a lower cavity, wherein said upper cavity is connected with the lower cavity through a center hole, wherein a top cover and a bottom cover are disposed at the top and bottom portions of the housing respectively, an upper hanging ring is fixed into the central portion of tile top cover, the rechargeable batteries are arranged within the upper cavity, wherein the upper cavity is coaxial with the lower cavity;

the wireless controls including a remote control, a control switch, antennas, and a wireless control module, wherein the control switch and the antennas are arranged in the top cover, and the wireless control module is disposed within the upper cavity;

the electromagnetic mechanism including an electromagnet and an iron core, wherein the electromagnet is arranged in the central portion of the cavity, the iron core is disposed within the electromagnet;

the release mechanism including a release pin, a movable sleeve, and a release sleeve, each one sequentially encasing the next from inside to outside, wherein the top portion of the release sleeve is connected with the iron core, wherein a lateral wall of the release sleeve includes an upper and lower radial through hole arranged adjacent to the bottom cover, wherein an outer wall of each upper and lower through hole includes an upper and a lower semicircular groove, wherein the upper semicircular groove passes through the upper through hole in a diameter direction of the upper through hole, and the lower semicircular groove passes through the lower through hole in a diameter direction of the lower through hole, and wherein a plurality of rubber rings are embedded within the upper and lower semicircular grooves;

the movable sleeve arranged within the release sleeve including a lateral wall on which a pair of conical bores are formed, wherein an external diameter of the conical bore adjacent to the release sleeve is the same as the diameter of the upper and lower through holes, wherein an internal diameter is smaller than the external diameter, and wherein a steel ball is disposed within each conical bore;

the release pin inserted into the movable sleeve through a release hole in the bottom cover further including a pair of semicircular grooves on an outer lateral wall, wherein a lower end of the release pin is connected with a lower ring and wherein a radius of the semicircular groove is the same as a radius of the steel balls.

2. The automatic releaser with wireless controls of claim 1, wherein a diameter of the upper cavity is larger than a diameter of the lower cavity.

3. The automatic releaser with wireless controls of claim 1, further comprising a LED display lamp arranged onto on the top cover.

4. The automatic releaser with wireless controls of claim 1, further comprising a battery charging connector arranged on the top cover.

5. The automatic releaser with wireless controls of claim 1, wherein an inner liner is arranged within the upper cavity, the plurality of rechargeable batteries are uniformly arranged within the inner liner along a circumferential direction, and the wireless control module is arranged above the rechargeable battery and electromagnet.

6. The automatic releaser with wireless controls of claim 1, wherein a securing pin is disposed on the lower cavity just below the upper cavity, the securing pin mated with a lateral wall of the lower cavity via a screw joint and forms a mechanical linkage with a top portion of the release sleeve.

7. The automatic releaser with wireless controls of claim 1, wherein a top portion of the release sleeve is connected with the iron core by a connecting pin that is inserted into an elongated pin hole in of the iron core.

8. The automatic releaser with wireless controls of claim 1, wherein an inner wall of the release sleeve between the upper and lower through holes is tapered.

* * * * *